(12) United States Patent
Kawada

(10) Patent No.: US 8,054,565 B2
(45) Date of Patent: Nov. 8, 2011

(54) LENS OPTICAL SYSTEM AND PHOTOELECTRIC ENCODER

(75) Inventor: Hiroaki Kawada, Kanagawa (JP)

(73) Assignee: Mitutoyo Corporation, Kanagawa (JP)

( * ) Notice: Subject to any disclaimer, the term of this patent is extended or adjusted under 35 U.S.C. 154(b) by 235 days.

(21) Appl. No.: 11/819,264

(22) Filed: Jun. 26, 2007

(65) Prior Publication Data

US 2008/0106796 A1    May 8, 2008

(30) Foreign Application Priority Data

Jun. 26, 2006   (JP) ................................. 2006-175064

(51) Int. Cl.
*G02B 7/02* (2006.01)
(52) U.S. Cl. ........................................ 359/820; 359/819
(58) Field of Classification Search .................. 359/819, 359/820, 811, 813, 815
See application file for complete search history.

(56) References Cited

U.S. PATENT DOCUMENTS

| | | | | | |
|---|---|---|---|---|---|
| 3,992,240 | A | * | 11/1976 | Kuehn, Jr. .................... | 156/250 |
| 5,114,513 | A | * | 5/1992 | Hosokawa et al. ........... | 156/150 |
| 5,159,193 | A | | 10/1992 | Shiraishi et al. | |
| 5,617,131 | A | * | 4/1997 | Murano et al. ................ | 347/233 |
| 6,014,232 | A | * | 1/2000 | Clarke .......................... | 358/482 |
| 7,002,759 | B2 | * | 2/2006 | Hama et al. ................... | 359/820 |
| 7,400,461 | B2 | * | 7/2008 | Kageyama et al. ........... | 359/819 |
| 2002/0075566 | A1 | * | 6/2002 | Tutt et al. ...................... | 359/619 |
| 2005/0231085 | A1 | * | 10/2005 | Song et al. .................... | 313/110 |
| 2008/0231965 | A1 | * | 9/2008 | Weekamp ..................... | 359/666 |

FOREIGN PATENT DOCUMENTS

| | | |
|---|---|---|
| JP | A-61-267001 | 11/1986 |
| JP | A-3-179420 | 8/1991 |
| JP | A-6-326831 | 11/1994 |
| JP | A 8-201674 | 8/1996 |
| JP | A 9-43508 | 2/1997 |
| WO | WO2005073779 | * 1/2005 |

OTHER PUBLICATIONS

Stefan Haselbeck et al.; "Microlenses Fabricated by Melting a Photoresist on a Base Layer."; *Optical Engineering*; vol. 32, No. 6; Jun. 1993; pp. 1322-1324.
Japanese Patent Office, Reasons for Refusal for Japanese Patent Application No. 2006-175064 (with partial English translation), Feb. 9, 2011, pp. 1-3 (pp. 1-4 for partial translation).

* cited by examiner

*Primary Examiner* — David N. Spector
*Assistant Examiner* — Brandi N Thomas
(74) *Attorney, Agent, or Firm* — Oliff & Berridge, PLC

(57) ABSTRACT

The present invention provides: a lens optical system having: a plastic lens; and a lens restraining member for mechanically restraining a thermal expansion of the plastic lens to control a variation of a curvature of lens due to a temperature change so as to suppress a variation of a focal position due to a temperature change; and a photoelectric encoder including the lens optical system.

9 Claims, 5 Drawing Sheets

THERMAL EXPANSION OF PLASTICS

THERMAL EXPANSION OF PLASTICS

R INCREASES WHEN TEMPERATURE RISES

THERMAL EXPANSION OF PLASTIC

RESTRICTED BY GLASS

R DECREASES WHEN TEMPERATURE RISES

LENS OPTICAL SYSTEM AND PHOTOELECTRIC ENCODER

The present application is based on Japanese Patent Application No. 2006-175064 filed on Jun. 26, 2006, and the contents thereof are incorporated herein by reference.

BACKGROUND OF THE INVENTION

1. Technical Field

The present invention relates to a lens optical system and a photoelectric encoder. More particularly, the present invention relates to a lens optical system capable of relaxing a variation of a focal length of a plastic lens due to a temperature change and one-side and both-side telecentric optical systems containing the lens optical system which are suitable for a linear scale and various optical equipments. Furthermore, the present invention relates to a photoelectric encoder containing them.

2. Description of Related Art

As one of optical lenses used in the optical instrument, there is the lens that is made of plastics (hereinafter referred to as "plastic lens"). This plastic lens has advantages that this lens is relatively inexpensive and also an aspheric surface can be easily shaped. However, on the other hand, the plastic lens has a disadvantage that a variation of a focal position due to a temperature change is large.

As the main factor in the variation of the focal position, a change of a refractive index of the lens due to a temperature change and a change in lens curvature due to a thermal expansion can be listed. In other words, explanation will be made by taking a plastic lens 10 as the biconvex spherical lens shown in FIG. 1 as an example. A relationship between a focal length f and a refractive index n, lens curvatures $R_1$, $R_2$ on the incident side and the emergent side, and a lens thickness d is given by following Equation (1).

$$1/f=(n-1)\times\{(1/R_1)-(1/R_2)+\{(n-1)^2/n\}\times\{d/(R_1\times R_2)\}\}. \quad (1)$$

Normally the refractive index n decreases and also the lens curvatures $R_1$, $R_2$ increase when the temperature rises. Therefore, both changes act in the direction to lengthen a focal length f. In contrast, both changes act in the direction to shorten a focal length f when the temperature falls.

Also, normally a change of the refractive index of the plastic lens and a variation of the focal length f due to the thermal expansion are ten times or more those of a lens that is made of glass (hereinafter referred to as "glass lens"), and these changes have great influences on lens performance. For this reason, some measure to relax such influences need to be taken.

For example, in Reference 1, it is set forth that a variation of the focal position due to a change of the refractive index can be cancelled by employing the hybrid lens in which plural pieces of lenses such as a convex lens, a concave lens, etc., whose lens profiles are different mutually, are aligned in combination.

Also, in Reference 2, it is set forth that the lens holding device can hold the plastic lens without change of the refractive index caused due to a deformation of the shape by preventing generation of internal stresses of the plastic lens. More particularly, expansion/contraction of the plastic lens caused due to changes in temperature and humidity are absorbed by the lens supporting member that holds the plastic lens while moving in the radial direction not to apply any external force to the plastic lens.

[Reference 1] JP-A-9-43508
[Reference 2] JP-A-8-201674

However, the hybrid lens set forth in Reference 1 has such a problem that an increase in cost and a difficulty of optical axis adjustment are caused due to an increase in the number of lenses.

In contrast, the lens holding device set forth in Reference 2 holds the plastic lens not to apply any external force to the plastic lens. As a result, temperature compensation of the lens focal length cannot be made.

SUMMARY OF THE INVENTION

The present invention provides a lens optical system and a photoelectric encoder making it possible to provide temperature compensation of a lens focal length at a minimum increase in cost with a relatively simple configuration.

In an embodiment of the present invention, in a lens optical system having a plastic lens, the lens optical system has a lens restraining member for mechanically restraining a thermal expansion of the plastic lens to control a variation of a curvature of lens due to a temperature change so as to suppress a variation of a focal position due to a temperature change.

In an embodiment of the present invention, the plastic lens can be a lens array.

Also, in an embodiment of the present invention, the lens restraining member can be a metal plate to which the plastic lens is fixed and in which a light transmitting hole for an optical path is formed.

Also, in an embodiment of the present invention, a fitting member for fitting the plastic lens to other member can be provided to the metal plate.

Also, in an embodiment of the present invention, a lens optical system can be constructed as an one-side or both-side telecentric optical system containing the above lens optical system.

Also, in an embodiment of the present invention, a photoelectric encoder including the above lens optical system is provided.

According to the present invention, a variation of the lens focal length due to a temperature change can be suppressed at a minimum increase in cost with a relatively simple configuration.

Furthermore, other advantages and effects of the present invention will become apparent from the following description, drawings and claims.

BRIEF DESCRIPTION OF THE DRAWINGS

FIG. 3A is a sectional view showing a thermal expansion due to a temperature change in the case of only plastics and FIG. 3B is a sectional view in the case of a combination of the glass and the plastics.

DETAILED DESCRIPTION OF EXEMPLARY EMBODIMENTS OF THE INVENTION

Some embodiments of the present invention will be explained in detail with reference to the drawings hereinafter.

First Embodiment

Figure 1:
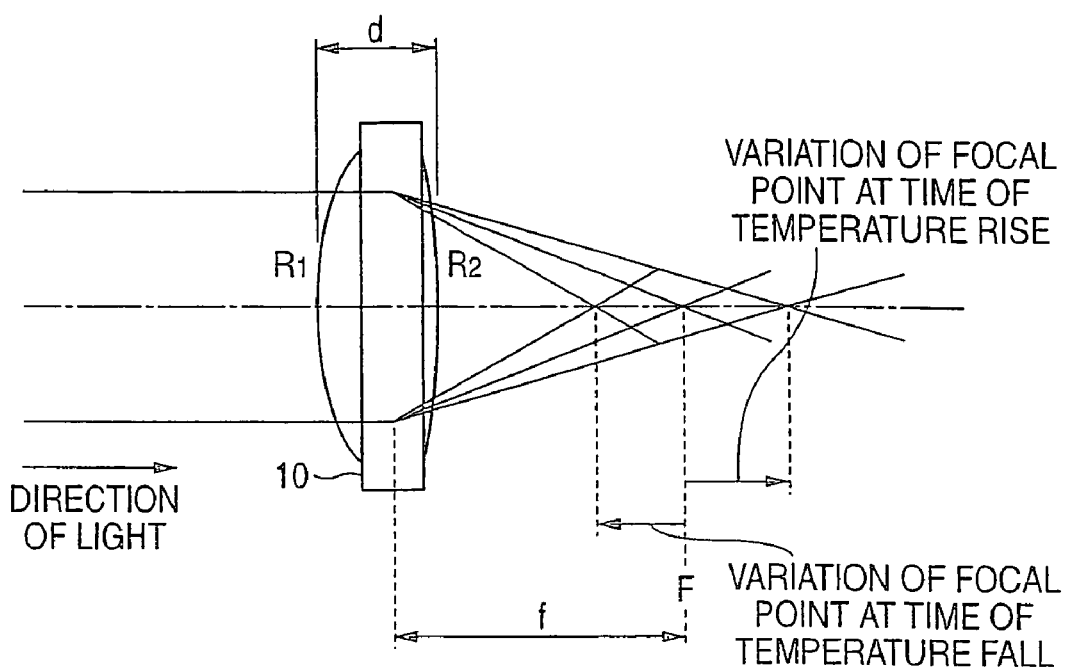
FIG. 1 is an optical path diagram explaining a variation of a focal position due to a temperature change.
Figure 2:
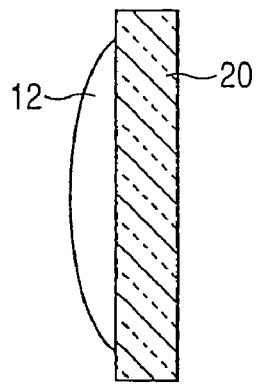
FIG. 2 is a sectional view showing a configuration of a first embodiment of the present invention.

As shown in FIG. 2, a first embodiment of the present invention is constructed by molding or adhering a plano-convex spherical plastic lens 12 on a planar glass substrate 20 integrally.

As the molding approach, for example, the stamping molding using UV curable resin or thermosetting resin, the thermal compression molding using thermosetting/thermoplastic resin, the injection molding, the transfer molding, etc. can be applied for the purpose of integral molding. Otherwise, the plastic lens 12 can be adhered integrally to a surface of the glass substrate 20 by using the powerful adhesive such as epoxy-based or acryl-based adhesive, or the like, for example.

Since a boundary, between the glass (20) and the plastics (12) is integrated strongly, a thermal expansion due to a temperature change is given as shown in FIG. 3.

Figure 3A:
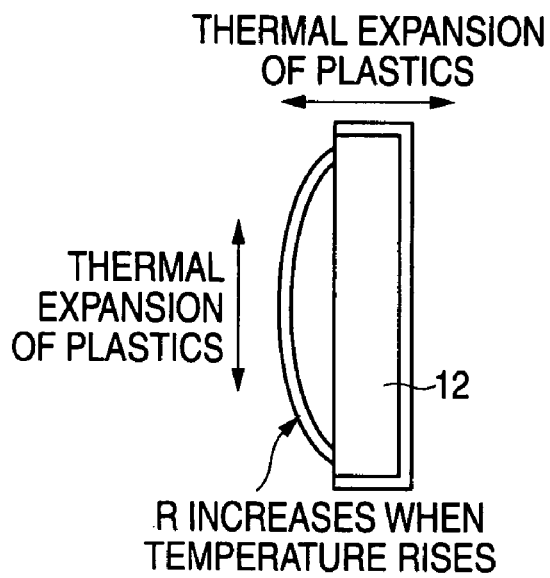
FIGS. 3A and 3B are drawings to explain the principle of the present invention.
Figure 3B:
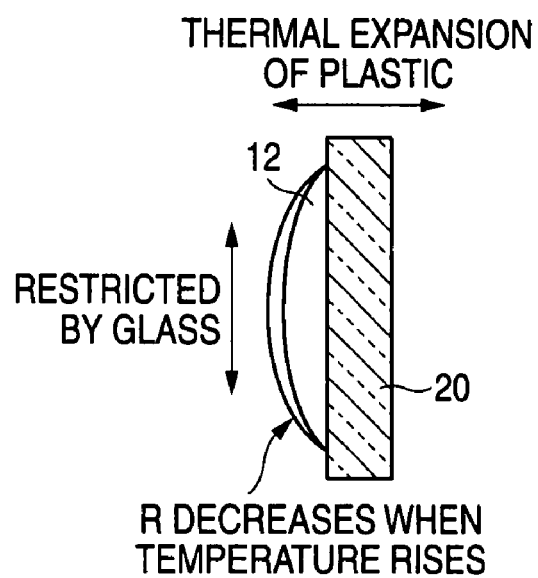
Figure 4:
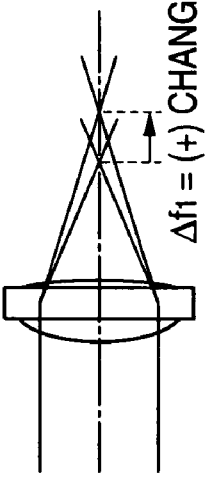
FIG. 4 is an optical path diagram explaining a variation of a focal position due to a temperature change.

More particularly, in the case of plastics only shown in FIG. 3A, a lens curvature R of the plastic lens 12 is increased with the temperature rise. In the case of combination of the glass and the plastics of an embodiment of the present invention shown in FIG. 3B, an increase of the lens curvature R due to the temperature rise is made small because a thermal expansion of the plastic lens in the vertical direction in FIG. 3 is restrained by the glass substrate 20. Variations of the focal position of the lens based on these mechanical behaviors are shown in FIG. 4.

In the case of plastics only, as shown in FIG. 4A, a variation of focal length $\Delta f_1$ due to a change in refractive index and a variation of focal length $\Delta f_2$ due to a change in lens curvature at a time of temperature rise are caused in the same direction. Therefore, a variation of focal length $\Delta f$ caused at a time of temperature rise is increased by an interaction of both variations, as given by following Equation (2).

$$\Delta f = \Delta f_1 + \Delta f_2 \quad (2)$$

In contrast, in the case of combination of the glass and the plastics of an embodiment of the present invention, as shown in FIG. 4B, a variation of focal length $\Delta f_1$ due to a change in refractive index and a variation of focal length $\Delta f_2$ due to a change in lens curvature at a time of temperature rise are caused in the opposite direction. Therefore, mutual influences of these variations act to cancel out each other, and thus a variation of focal length $\Delta f$ at a time of temperature rise is made small, as given by following Equation (3).

$$\Delta f = \Delta f_1 - \Delta f_2 \quad (3)$$

Therefore, a change of the lens curvature R due to a temperature change can be regulated by restraining mechanically a thermal expansion caused due to a temperature change by using the glass substrate 20, or the like, so that a variation of the focal length $\Delta f$ can be put closer to 0. As a result, temperature compensation of the focal length can be made.

Here, FIG. 2 shows an example of the plano-convex spherical lens. Also, a biconvex lens or a concave spherical lens (one-side or both-side), the aspheric lens (convex, concave, one-side, both-sides), and the like may be employed on the assumption that a variation of the focal length should be put close to $\Delta f = 0$.

Second Embodiment

Next, a second embodiment of the present invention will be explained hereunder.

Figure 5A:
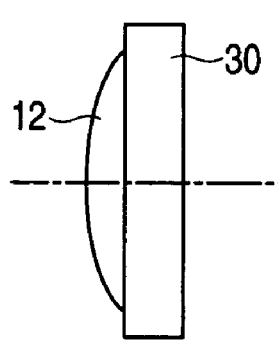
FIG. 5A is a sectional view showing a configuration of a second embodiment of the present invention.
Figure 5B:
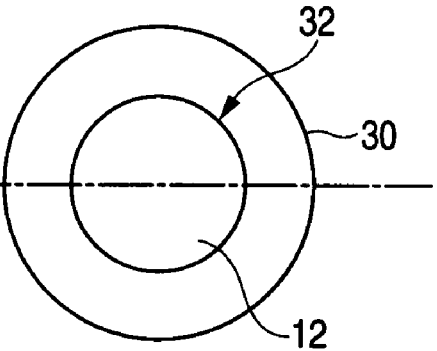
FIG. 5B is a side view thereof.

As shown in FIG. 5A (sectional view) and FIG. 5B (side view), this second embodiment is constructed such that the flat glass substrate of the first embodiment is replaced with a ring-like metal flat plate (metal plate) 30 and the plano-convex spherical plastic lens 12 is molded or adhered on this metal plate. Therefore, a thermal expansion of the plastic lens 12 can be restrained mechanically and thus temperature compensation of the focal length can be provided.

A thin plate such as an etching plate, or the like is employed as the metal plate 30, and a light transmitting hole 32 for an optical path is formed around an optical axis of the lens. This light transmitting hole 32 may be formed to have a size equivalent to an effective aperture of the lens.

Third Embodiment

Next, a third embodiment of the present invention will be explained hereunder.

Figure 6A:
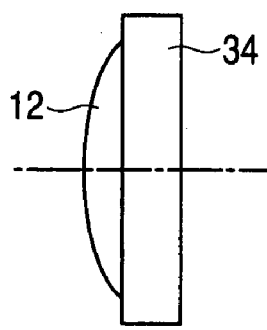
FIG. 6A is a sectional view showing a configuration of a third embodiment of the present invention.
Figure 6B:
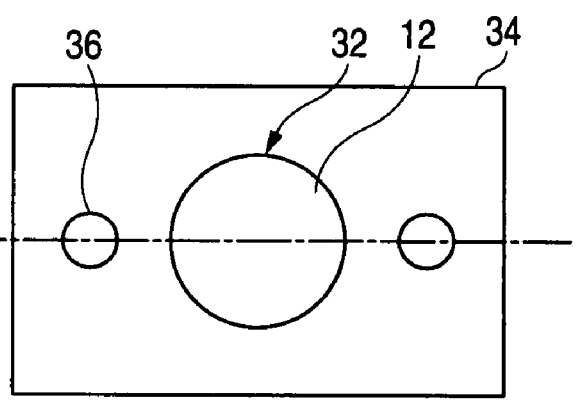
FIG. 6B is a side view thereof.

As shown in FIG. 6A (sectional view) and FIG. 6B (side view), this third embodiment is constructed such that a rectangular metal plate 34 is employed instead of the ring-like metal plate 30 and threaded holes 36 used to fit the lens to the case, or the like are formed integrally.

Fourth Embodiment

Figure 7:
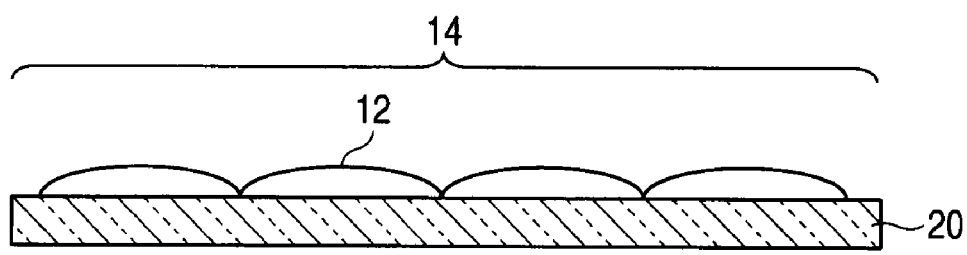
FIG. 7 is a sectional view showing a configuration of a fourth embodiment of the present invention.

Next, a fourth embodiment in which the present invention is applied to a plastic lens array is shown in FIG. 7 hereunder.

Like the first embodiment, in this embodiment, a lens array 14 made of plastics (hereinafter referred to as a "plastic lens array") is constructed by molding or adhering a plurality of plano-convex plastic lenses 12 on the planar glass substrate 20. As the method of forming the plastic lens array 14 integrally on the glass substrate 20, the method similar to the first embodiment can be employed.

Also, the principle of temperature compensation is similar to that in the first embodiment, and thus its detailed explanation will be omitted herein.

In addition, like either the second embodiment shown in FIG. 5 or the third embodiment shown in FIG. 6, the glass substrate 20 may be changed for the metal plate 30 or 34.

Fifth Embodiment

Figure 8:
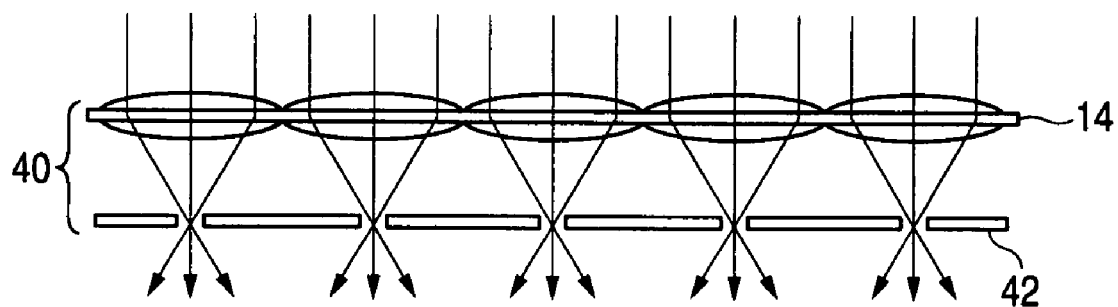
FIG. 8 is an optical path diagram showing a configuration of a fifth embodiment of the present invention.

Next, a fifth embodiment of the present invention in which the lens array of the fourth embodiment is applied to an one-side telecentric optical system for image formation is shown in FIG. 8.

An one-side telecentric optical system 40 contains the plastic lens array 14 similar to that of the fourth embodiment, and an aperture array 42 whose apertures are aligned in the focal positions of respective lenses of the plastic lens array 14.

A variation of focal length of respective lenses links directly with a change of resolution in such imaging optical system (40). However, a change of resolution due to the temperature change can be relaxed by employing the lens array of the fourth embodiment.

Here, FIG. 8 shows the one-side telecentric optical system 40. But the lens array of the fourth embodiment may be applied similarly to a both-side telecentric optical system for image formation. Also, not only the lens array but also a single lens in any of the first to third embodiments may be applied similarly to the one-side telecentric optical system or both-side telecentric optical system for image formation.

Sixth Embodiment

Figure 9:
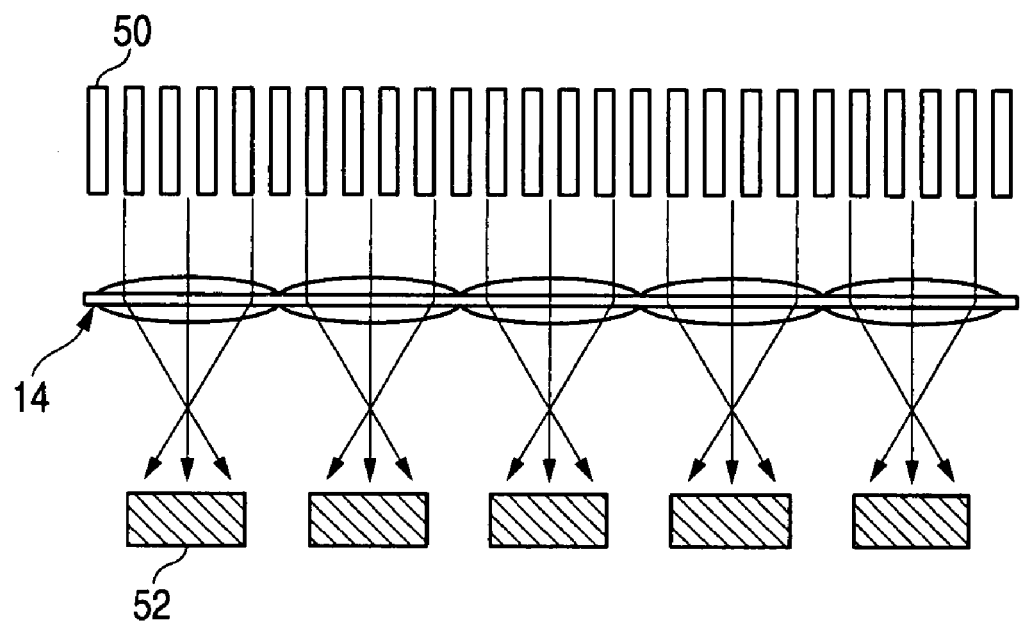
FIG. 9 is an optical path diagram showing a configuration of a sixth embodiment of the present invention.

Next, a sixth embodiment of the present invention in which the lens array of the fourth embodiment is applied to a photoelectric encoder is shown in FIG. 9. In FIG. 9, 50 is a scale, and 52 is a light receiving array device.

When a focal position is varied due to the temperature change, an output of the encoder is deteriorated. However, in the photoelectric encoder using the lens or the lens array according to the present invention, this deterioration can be reduced.

While the present invention has been described in detail and with reference to specific embodiments thereof, it will be apparent to one skilled in the art that various changes and modifications can be made therein without departing from the spirit and scope thereof.

What is claimed is:

1. A lens optical system comprising:
   a plastic lens; and
   a lens restraining means for mechanically restraining a thermal expansion of the plastic lens to control a variation of a curvature of the plastic lens caused by a temperature change to suppress a variation of a focal position caused by the temperature change, wherein the lens restraining means is a flat ring-like metal plate to which the plastic lens is fixed.

2. The lens optical system according to claim 1, wherein the plastic lens is a lens array.

3. The lens optical system according to claim 1, wherein the lens restraining means mechanically restrains the thermal expansion of the plastic lens in a direction perpendicular to an optical axis direction of the plastic lens.

4. The lens optical system according to claim 3, wherein a fitting member for fitting the plastic lens to another member is provided to the lens restraining means.

5. A lens optical system comprising the lens optical system according to claim 1 and constituting a one-side telecentric optical system.

6. A lens optical system comprising the lens optical system according to claim 1 and constituting a both-side telecentric optical system.

7. A photoelectric encoder comprising the lens optical system according to claim 1.

8. The lens optical system according to claim 1, wherein the lens restraining means expands less than the plastic lens when the lens restraining means and the plastic lens are subject to temperature change.

9. The lens optical system according to claim 1, wherein the plastic lens is one of integrally molded to or adhered on the lens restraining means.

* * * * *